June 8, 1965    D. H. DOEHLERT    3,188,193
MOLDS FOR BENDING GLASS SHEETS WITH INTERMEDIATE SUPPORT POINTS
Original Filed Feb. 6, 1959    4 Sheets-Sheet 1

Inventor
DAVID H. DOEHLERT

By Oscar L. Spencer
Attorney

June 8, 1965   D. H. DOEHLERT   3,188,193
MOLDS FOR BENDING GLASS SHEETS WITH INTERMEDIATE SUPPORT POINTS
Original Filed Feb. 6, 1959   4 Sheets-Sheet 2

Inventor
DAVID H. DOEHLERT

By

Oscar L. Spencer
Attorney

June 8, 1965 D. H. DOEHLERT 3,188,193
MOLDS FOR BENDING GLASS SHEETS WITH INTERMEDIATE SUPPORT POINTS
Original Filed Feb. 6, 1959 4 Sheets-Sheet 3

INVENTOR.
DAVID H. DOEHLERT
BY
Oscar L Spencer
ATTORNEY

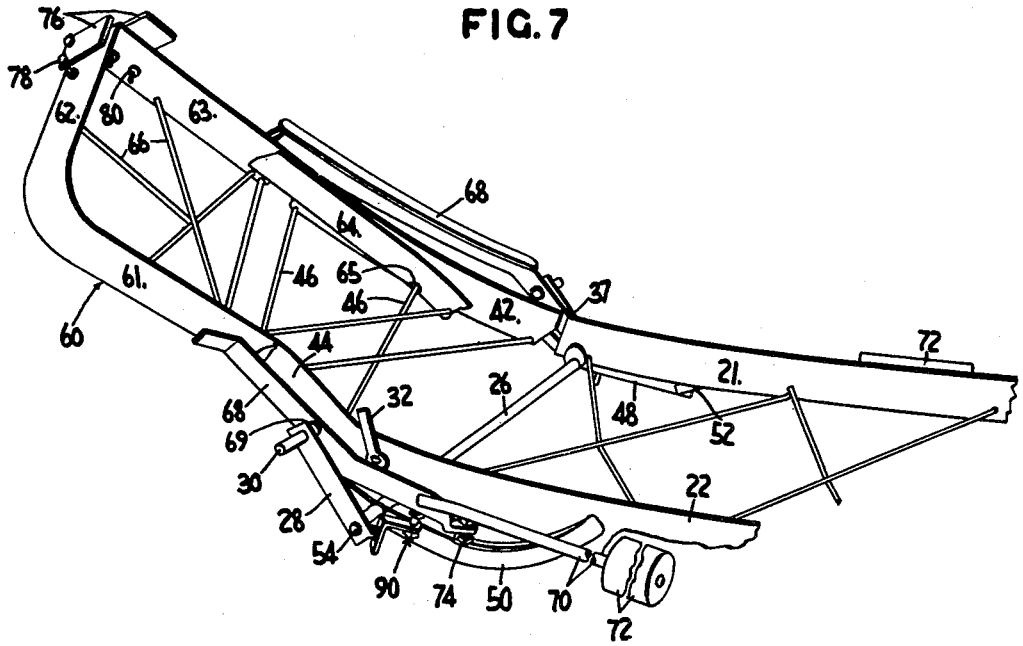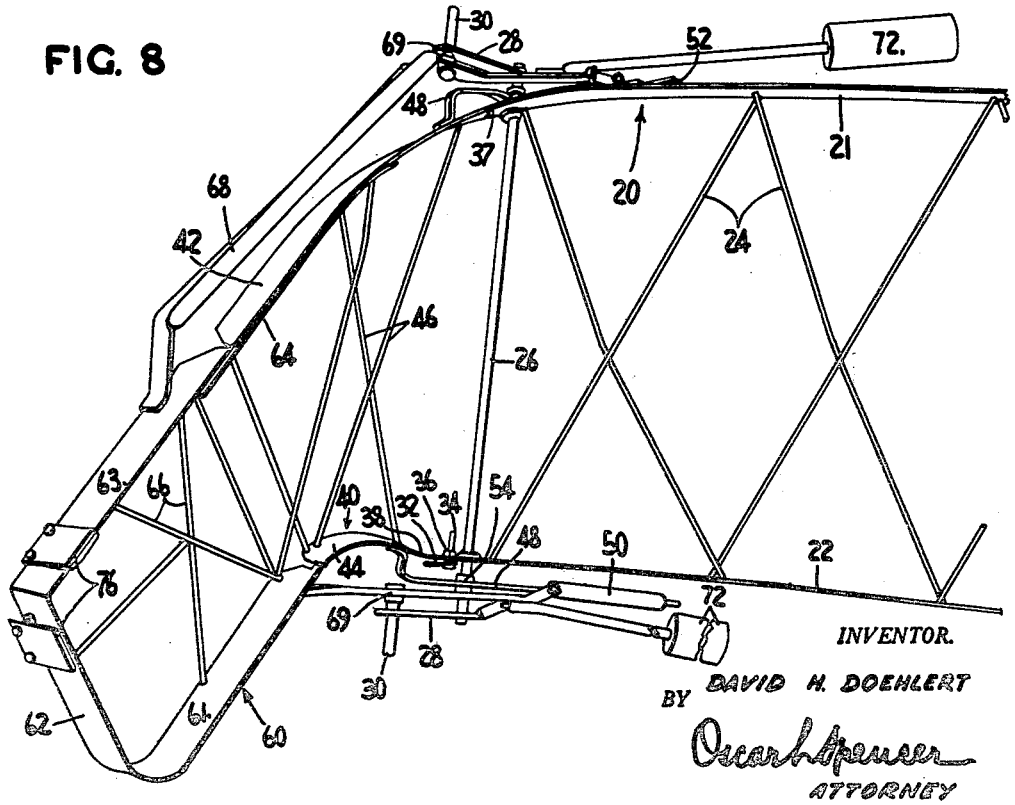

3,188,193
MOLDS FOR BENDING GLASS SHEETS WITH INTERMEDIATE SUPPORT POINTS
David H. Doehlert, Newark, Del., assignor to Pittsburgh Plate Glass Company, Pittsburgh, Pa., a corporation of Pennsylvania
Continuation of abandoned application Ser. No. 792,253, Feb. 6, 1959. This application Feb. 14, 1961, Ser. No. 89,183
20 Claims. (Cl. 65—289)

This application is a continuation of application Serial No. 792,253, filed February 6, 1959, now abandoned, which, in turn, is a continuation of application Serial No. 619,153, filed October 30, 1956, now abandoned, for Bending Glass Sheets.

This application relates to molds for bending glass sheets, particularly extremely large, grotesquely shaped flat sheets having obliquely extending extremities, which are to be bent to deep complex curvatures having a relatively gently curved central portion merging into regions of severe curvatures and terminating in relatively long, flat extremities which are bent substantially perpendicularly to the central portion of the sheet. Such bends are asymmetrical with respect to the longitudinal axis of the sheet.

Conventionally, flat glass sheets are bent into curved shapes by mounting them on sectionalized skeleton molds comprising molding members which are spread open to receive the glass and are capable of moving into a closed mold position to form a substantially continuous shaping frame whose upper surface conforms in elevation and outline to the curvature desired for the bent glass sheet. The glass laden molds are conveyed through a tunnel-like lehr where the glass and the mold are heated to glass softening temperatures. At these temperatures, the glass softens and conforms to the mold as the latter moves into its closed position. The bent glass sheet is then annealed or tempered depending upon the ultimate product fabricated.

When bending glass to the complex curvatures described above, considerable difficulty is encountered in maintaining the sheet extremities relatively flat while curving the portions immediately inboard of these flat extremities to the severe curvatures required. The present invention provides novel apparatus which facilitates production of such complex curvatures.

According to an illustrative embodiment of the present invention, the desired results are obtained by sectionalizing the mold in a novel manner. The mold elements include a central section comprising a pair of spaced rails of relatively gentle contour conforming in elevation and outline to the curvature desired for the central portion of a glass sheet to be supported on the mold. Flanking each longitudinal extremity of the central molding member is an intermediate molding member comprising severely curved rails conforming in elevation and outline to the severely curved intermediate portions of the glass sheet contour. A freely rotatable, relatively flat end molding member, comprising a rail bent into side legs and a connecting leg to form a substantially J-shaped contour, is located beyond each intermediate molding member.

Each end molding member is rotatable about hinges relative to the central molding member to support an extremity of the flat glass sheet mounted for bending on the extended mold and is provided with an inwardly directed extension having a planar elongated upper flat glass supporting surface that helps support one side of the flat glass sheet precut to outline before bending. The molding members are so dimensioned and their pivots so located that in the spread mold position, the longitudinal extremities of the rails of the center section provide spaced, intermediate support points for the flat glass in the same horizontal plane as the end members and their extensions, while the intermediate molding members are rotatable simultaneously with the rotation of the end members to a position below the flat glass support plane of the open mold.

The intermediate molding members are rotatable about hinges fixed by means of connector plates to the hinges about which the end molding members are rotated. When the mold is closed, the intermediate molding members move upwardly into position for supporting the curved glass at its intermediate portions and to define with the central mold members and end molding members a substantially continuous shaping frame conforming in elevation and outline to the shape desired for the bent glass sheet. The extensions attached inwardly of the end molding members to support the flat glass are replaced as intermediate glass supports by the intermediate molding members when the mold closes. In order to allow replacement of intermediate glass support elements, the extensions are aligned to nest beside the adjacent rails of the intermediate molding members as the mold assumes its closed position.

Each end molding member is rotatable about a first pair of hinges and is counterweighted to provide a net force tending to close the mold. Each intermediate molding member is rotatable about a second pair of hinges and is pivoted to rotate away from glas supporting contact in the absence of an external force. The external force tending to rotate the intermediate molding member into the closed mold position is supplied by the counterweighted end molding member. This is accomplished by attaching a cam to the intermediate molding member, a cam follower to the end molding member and connector plates between adjacent hinges of the respective pairs of hinges. Each said cam, said cam follower, said connector plates and said hinges flanking either longitudinal extremity of the central molding member cooperate with each other to provide means responsive to rotation of an end molding member to rotate its adjacent intermediate molding member at a greater angular velocity than that of the end molding member. For the purpose of definition, the relative rotational velocity of each intermediate molding member 40 and its adjacent end molding member 60 is determined by comparing the angle of rotation between the spread and closed mold positions of the outboard extremity of each intermediate molding member 40 compared to the angle of rotation of the inboard extremity of its adjacent end molding member 60 with respect to an axis formed by connecting the laterally opposite longitudinal extremities 37 and 38 of center section rails 21 and 22, respectively, immediately adjacent the intermediate molding section in question. Since both sections take the same time to move from the spread to the closed mold positions, and the intermediate molding member rotates through a greater angle than its adjacent end molding member, it is obvious that each intermediate molding member rotates at a greater angular velocity than its adjacent end molding member.

Thus, when the open mold supporting an unbent glass sheet starts to close, the longitudinal extremities of the sheet are lifted on the relatively flat or planar surfaces of the end molding members and the extensions. Such support by the extensions causes the sheet to fold about axes inboard of the inner extremities and to remain flat after bending. While the mold closes, the cam follower on the end molding member rides on the cam of the intermediate molding member to shorten the moment arm about the hinge axis about which the intermediate molding member is forced to rotate. Shortening the moment arm accelerates the rotation of the intermediate molding member upwardly until the intermediate molding member assumes its position of support for the intermediate portion of the glass. The mold construction is such that the intermediate molding member assumes its glass supporting position toward the end of the bending cycle, thus postponing as long as possible impressing its upper curvature onto the heat softened glass sheet and insuring that the flat sheet extremity remains flat.

A primary object of the present invention is to provide apparatus for bending large flat glass sheets having grotesque outlines into complex curvatures wherein overbending of the flat glass extremities is prevented and the bend is imparted in the proper position along the sheet.

Another object of the present invention is to provide apparatus for bending glass sheets on a mass production basis and within precise tolerances to complex curvatures having a relatively gently curved central portion merging into regions of severe curvatures and terminating in elongated relatively flat extremities which are bent substantially perpendicularly to the central portion of the sheet.

These and other objects of the present invention will become obvious upon studying a particular embodiment of this invention which is described herein for purposes of illustration rather than limitation. Various modifications not disclosed in the illustration, which become obvious upon reading this description, are encompassed in the accompanying claims. Also, the principles of the present invention, while especially useful in producing bends of the nature described are also useful for bending glass of more or less grotesque shapes to bends that are more or less severe than those depicted. Particularly, the flat extremities may be longer or shorter than the dimensions of a typical pattern cited for illustration.

In the drawings forming part of the description of the present invention,

FIGURE 7 is a view similar to FIGURES 4, 5, and 6 showing the mold portion when the mold is completely closed.

FIGURE 8 is a plan view of the portion of the mold as shown in FIGURE 7 in its closed position.

Figure 1B:
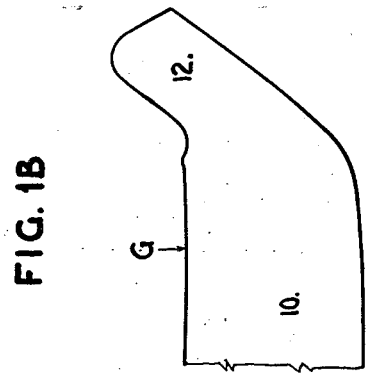
FIGURE 1B is a plan view of one-half a typical sheet before bending, showing its outline to exact scale.
Figure 1A:
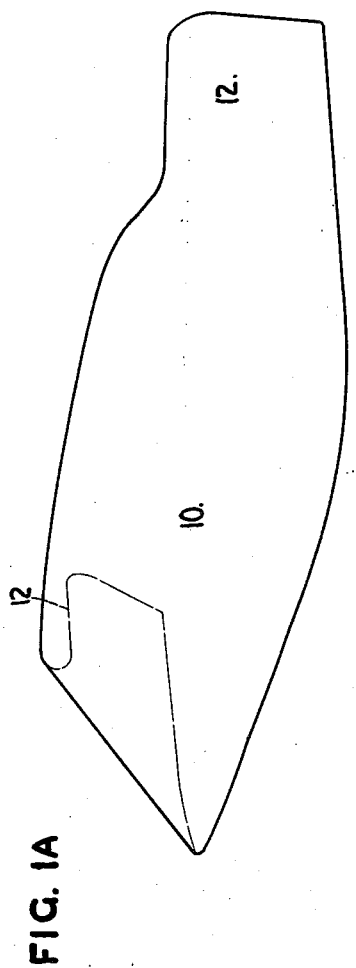
FIGURE 1A is a perspective view of a curved glass sheet after bending.
Figure 2:
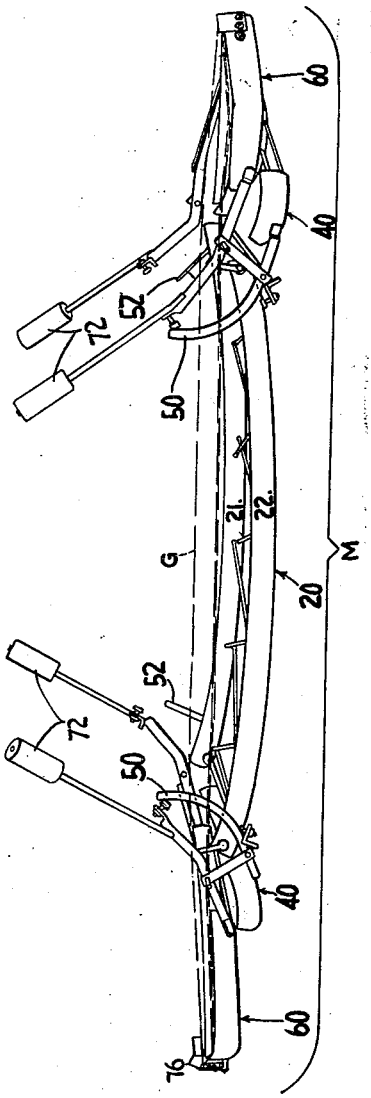
FIGURE 2 is a front elevation, partially in perspective, of a bending mold built according to the teachings of the present invention showing the mold in its open position loaded with a flat glass sheet preparatory to bending.

Referring to the drawings, reference character G refers to a sheet of glass having a central portion 10 and wing portions 12 bent severely relative to the central portion. In the ultimate product, an automobile backlight, shown in FIGURE 1A, the glass sheet is so shaped that the central portion 10 forms the rear portion and the longitudinal extremities 12 the side portions of the window closure. The outline of the precut glass sheet shows the longitudinal extremities 12 curved to form tabs extending obliquely of the central portion 10 a considerable distance. The particular pattern shown has a length of 91 inches, a width of 28 inches and requires bending the extremities to produce a depth of bend of 19 inches.

The problems of supporting flat glass sheets having contours departing so widely from rectangular shapes and bending such sheets to sharp curvatures within precise tolerances are solved by the novel mold structure described herein. The special structural elements of molds following the present invention insure elongated flat extremities for the bent glass sheet.

A mold M, typical of the present invention and shown in FIGURES 2–8, comprises a central molding member 20, intermediate molding members 40 flanking the central molding member and end molding members 60 at each extremity of the mold. The central molding member 20 comprises a pair of spaced rails 21 and 22 having upper shaping surfaces conforming to a portion of the curvature desired for the bent glass sheet. Rails 21 and 22 are interconnected by cross braces 24 and near their extremities by hinge rods 26. Connector plates 28 are fixed at their lower ends to the latter and terminate at their upper extremities near a stub rod 30. Guides 32 are attached by means of nuts 34 and bolts 36 adjacent the longitudinal extremities 38 of the center mold member rail 22. Rail 21 is provided with longitudinal extremities 37.

Each intermediate molding member 40 comprises spaced rails 42 and 44 having upper shaping surfaces conforming in elevation and outline to the intermediate portions of the opposite sides of the bent glass sheet. The rails are interconnected by cross braces 46. A hinge arm 48 is attached to the outer side of each rail 42 and 44 and extends inboard to terminate in either a cam 50 or a cam portion 52 (see FIGURES 2 and 8). The hinge arms 48 form a first pair of hinges 54 with hinge rod 26 adjacent the opposite extremities of the latter.

The center of gravity of the intermediate molding member and its associated cam lies outside the axis of rotation defined by hinges 54. Thus, in the absence of an exterior force, the intermediate members tend to drop below the glass support surface provided by the upper shaping surfaces of the other mold elements.

The end molding members 60 are substantially J-shaped in plan and comprise a continuous rail formed into one side leg 61, a connecting leg 62, and another side leg 63. An inwardly directed extension 64 having a free inboard extremity is attached to the inner side of leg 63 and is so shaped that its upper surface is planar, but in plan may be curved to nest beside an intermediate molding member rail. The inboard extremity of each extension 64 terminates outboard of the center of the mold and is provided with a notch 65 at its undersurface. Cross braces 66 interconnect the legs of the end members. The upper surface of each end molding member conforms to the elevation and outline desired for an extremity of the glass sheet, except for extension 64 whose elongated upper surface is planar to provide a line of support for the flat glass sheet region ultimately supported in the closed mold position by the intermediate molding members 40. Extension 64 thus serves as flat glass support means that supports the flat glass sheet along a substantial portion of the length of a longitudinal edge thereof.

Bearing straps 68 are connected to the outer surface of each leg of the end molding members and extend inwardly thereof to form a second pair of hinges 69 with stub rods 30. Counterweight arms 70 provided with counterweights 72 are attached to the inboard extremity of the bearing straps 68. Also, cam followers 74 are secured to the undersurface of the bearing straps 68.

The counterweights 72 are constructed of sufficient mass so that the end molding members are counterweighted to such an extent that their centers of gravity lie inboard of hinges 69 with the net bending moment insufficient to overcome the mass of a rigid flat glass sheet plus the counterbalancing effects of the intermediate molding members. However, once the glass softens, the bending moments provided by the counterweights should be enough to lift the heat softened glass sheet extremities and to force the intermediate molding members to rotate upwardly into their closed mold position.

The end molding members are also provided with end guides 76 secured to appropriate portions of the end molding members such as connecting leg 62 and side leg 63 by means of bolts 78 and nuts 80. The end guides 76 should be so located at the extremities of the mold and diagonally opposite the guides 32 attached to the center molding member so as to provide proper guidance for positioning the flat glass sheet upon the open mold preparatory to bending and also to maintain alignment of the sheet on the closing mold during bending. The end guides may be constructed as shown or in many other structural equivalents well known in the art. A large choice of possible structures is possible because the flat sheet extremities do not move relative to the end molding members while bending occurs because of the relative flatness of the extremities of the bent glass sheet.

The mold is also provided with stop members 90 which comprise angle irons 92 (see FIGURE 6) secured to the hinge rod 26. Each angle iron includes an apertured horizontal tab 94 through which is secured a bolt 96 and adjusted securely into place by means of lock nuts 98.

Before such a mold can be used to bend glass sheets, it is mounted on an open frame carriage having ledges to support the stub rods 30. Of course, the mold and carriage can be made unitary, but such structures consume much storage space when not in use. However, the carriage structure used with the molds illustrated forms no part of the present invention and is well known in the art.

When the mold is opened to receive flat glass sheets, the end molding members 60 rotate about hinges 69 and the intermediate molding members 40 are freed to rotate with cams 50 about hinges 54. The locations of the hinges 69 and 54 are so chosen that the intermediate molding members 40 drop below the horizontal support plane defined by the outboard extremities of the central molding member rails 21 and 22 and the outboard extremity of end molding members 60 in the spread mold position. The planar elongated upper glass supporting surfaces of the extensions 64 are tangent to this plane in the open mold position.

When the glass laden mold is conveyed through a bending lehr past zones of increasing heat, the glass sheet mounted on the mold begins to soften and the end molding members 60 begin to rotate about hinges 69, with cam followers 74 following cam 50 as the bending cycle continues. Note that in FIGURE 4 cam follower 74 is shown to be in contact with the upper inboard extremity of cam 50. The extension 64 is above rail 42 and is contacting the undersurface of the glass.

Figures 5, 6:
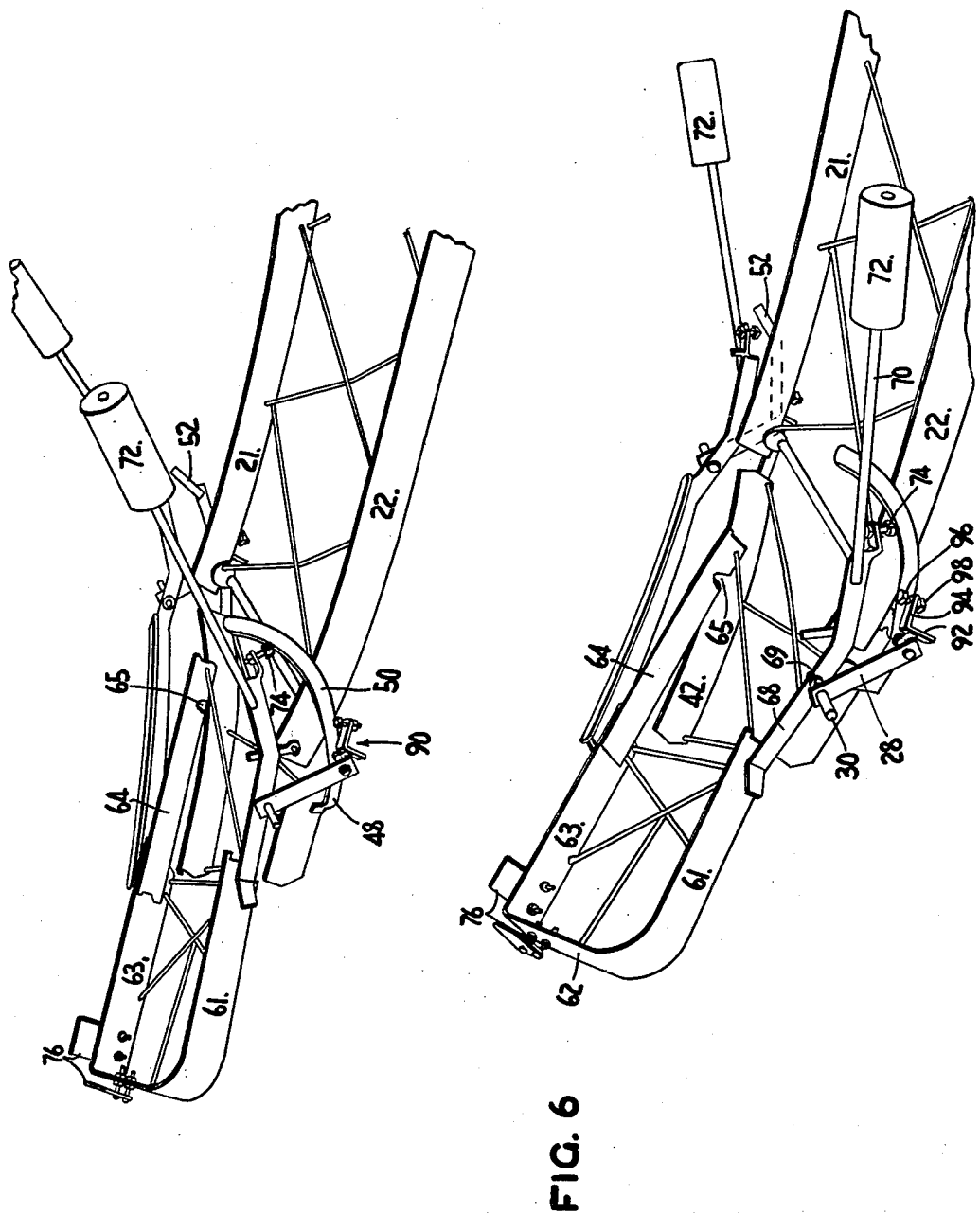
FIGURE 5 is a view similar to FIGURE 4 showing the mold portion when the mold is starting to close.
FIGURE 6 is a view similar to FIGURES 4 and 5 showing the mold portion when the mold has advanced further in the bending cycle.

As the bend begins, as shown in FIGURE 5, the end molding members 60 and the upper elongated planar surfaces of their extensions 64 provide long uninterrupted support as the rotations of the end members begin to fold the extremities of the glass sheet upwardly. The relative location of the hinge pairs 54 about which the end members rotate and the hinge pairs 69 about which the intermediate molding members rotate, and the connector plates 28 interconnecting the hinge rods 26 and 30 which support the respective hinge pairs cause the end molding members 60 to force the adjacent intermediate molding members 40 to rotate upwardly at an ever increasing rotational velocity by virtue of the pressure of cam followers 74 against cams 50 as the end molding members 60 rotate toward the closed mold position. Thus, as seen in FIGURE 6 wherein the bending cycle is more than one-half completed, the inboard extremity of the extension 64 is shown at the level of the glass shaping surface defined by that portion of the intermediate molding member rail 42 that it appears to intersect in the figure. Cam followers 74 have moved inboard along cams 50 thus shortening the moment arm through which the rotational forces of the end molding members are applied to rotate the intermediate molding members.

At this portion of the bending cycle, cam followers 74 at the rear of the view seen in FIGURE 6 have almost come into contact with the cam portions 52. Experiments have demonstrated that only at the end of the bending cycle is it necessary for the cam followers on both sides of the bending mold to be in sliding engagement with cams. Providing cam sections 52 in lieu of cams 50 along one side of the mold facilities loading and unloading of the glass sheets.

Figure 3:
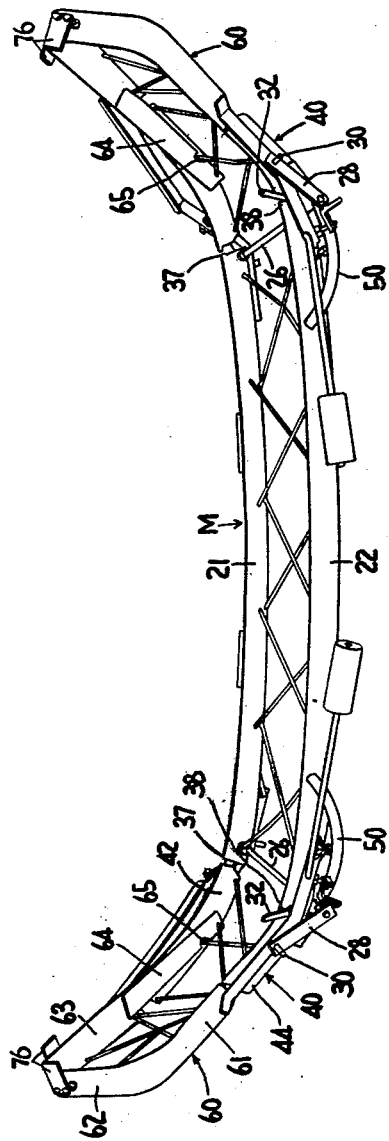
FIGURE 3 is a view similar to FIGURE 2 showing the mold in its closed position after the bend has been completed.
Figure 4:
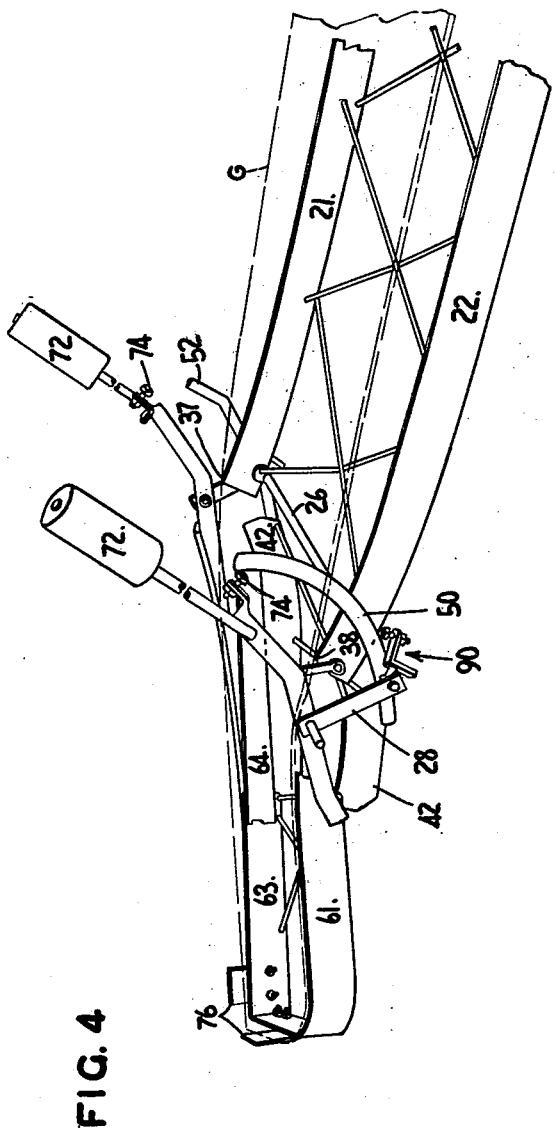
FIGURE 4 is an enlarged detailed perspective view of a portion of a mold in its spread position loaded for bending.

Rails 42 and 44 of the intermediate molding members 40 remain below the glass shaping surface until the rotation of the mold is substantially completed into its closed mold position as depicted in FIGURES 3 and 7. In FIGURE 7, the extension 64 of the end molding member 60 is shown to have dropped below the mold shaping surface defined by the intermediate mold rail 42 in the closed mold position. Note that the extension 64 nests beside rail 42 in the closed mold position. A minimum offset is desirable to insure that the glass is supported near its edge by first the extension and later the intermediate rail.

Note that the extensions 64 of end molding members 60 are shown attached to the inner sides of the legs 63 by welding and thus extend inwardly of the mold within the intermediate mold rail 42. However, the extension may be attached to the outside surface of the leg in certain outlines if the hinges are located appropriately. Further closing of the mold is prevented by the abutment of the undersurface of the bearing straps 68 against the upper surface of stop member 90, once the end molding members reach the closed mold position. The notches 65 permit the extensions 64 to move below the mold shaping surface defined by the intermediate mold rail 42 by providing a clearance between the underside of the extension 64 and a cross brace 46 (FIGURE 7).

The relative locations of the stub rods 30, which define the axes of rotation of the end molding members 60 and the hinge rods 26, which define the axes of rotation of the intermediate molding members 40, is very important. Unless the axes of rotation are so located that the intermediate molding members rotate with ever increasing velocity relative to that of the end molding members, it is impossible to move the intermediate molding members to a position below the flat glass support plane defined by the open mold, and to have the intermediate molding members assume their intermediate position in the shaping frame defined by the closed mold. For the particular bend required to shape glass sheets having a longitudinal dimension of 91 inches, transverse dimension of 28 inches to be shaped to a curvature having a depth of 19 inches, we have found it necessary to rotate the end molding members about relatively outboard hinges located in an oblique upward position from the hinges about which the intermediate members are rotated.

The relative flatness of the end members despite the depth of the bend requires that the end portions of the glass sheet be supported along relatively long lines of contact to prevent overbending of the glass extremities. The provision of the cam attached to the intermediate molding members and the cam follower attached to the end molding members and the connector plates between the hinge rods about which the various rotatable molding members are rotated enables flat glass sheets precut to grotesque outlines to be supported along relatively long lines of support during the early stages of the bending cycle, and facilitate bending the glass to relatively sharp bends at distances separated from the glass sheet extremities a considerable proportion of the glass sheet lengths.

In the illustrative embodiment described hereinabove, the longitudinal extremities 38 of rail 22 are located at spaced points on one side of the longitudinal center line of the mold to serve as first flat glass support means engageable with one longitudinal side edge area of the flat glass sheet at spaced apart points and the planar upper surface of extensions 64 located on the other side of the longitudinal center line of the mold serve as second flat glass sheet support means engageable with the opposite longitudinal side edge only along a substantial portion of the length thereof. The first flat glass support means and the second flat glass support means cooperate to provide flat glass sheet engaging means that support a flat glass sheet in a horizontal plane when the latter is mounted on a mold preparatory to bending.

While a particular embodiment of the invention has been described for illustration, many features may be changed without departing from its spirit. For example, extension 64 is shown extending along the longer side of the bending mold to be occupied in its closed position by long intermediate rail 42. Other modifications departing from the structure described but within the spirit of the invention are encompassed by the following claims.

What is claimed is:

1. Apparatus for bending glass comprising a central molding member, a pair of intermediate molding members flanking the central molding member, an end molding member beyond each intermediate molding member, said molding members having upper shaping surfaces and being movable into a spread mold position for supporting flat glass sheets for bending and into a closed mold position to provide a substantially continuous shaping frame conforming in elevation and outline to the shape desired for the bent glass sheet, a cam attached to each intermediate molding member, a cam follower attached to each end molding member and in sliding contact with the cam, a first pair of hinges for each intermediate molding member, a second pair of hinges for each end molding member, connector means securing a hinge of the first pair to a hinge of the second pair, and counterweight means secured to each end molding member to locate the center of gravity of the latter and its attached cam follower inboard of the axis of rotation defined by the second pair of hinges, the center of gravity of the intermediate molding member and its associated cam being located outboard of the axis of rotation defined by the first pair of hinges, the net effect of the dispositions of the two centers of gravity serving to provide a net rotational moment tending to rotate the end and intermediate molding members into the closed mold position.

2. The apparatus according to claim 1, wherein the first pair of hinges is located inboard of the second pair of hinges.

3. Apparatus for bending glass comprising a central molding member, a pair of intermediate molding members flanking the central molding member, an end molding member beyond each intermediate molding member, said molding members having upper shaping surfaces and being movable into a spread mold position for supporting flat glass sheets for bending and into a closed mold position to provide a substantially continuous shaping frame conforming in elevation and outline to the shape desired for the bent glass sheet, a cam attached to each intermediate molding member, a cam follower attached to each end molding member and in sliding contact with the cam, a first pair of hinges for each intermediate molding member, a second pair of hinges for each end molding member, connector means securing a hinge of the first pair to a hinge of the second pair, and counterwegiht means secured to each end molding member to urge the latter to move with its cam follower into the closed mold position and acting through the cam follower and cam to urge its adjacent intermediate molding member into the closed mold position, an extension having a planar, elongated, upper flat glass supporting surface fixed to each end molding member and constructed to nest along the side of a portion of the adjacent intermediate molding member when the mold assumes its closed position.

4. In apparatus for bending glass comprising a central molding member, a pair of intermediate molding members flanking the central molding member, and an end molding member beyond each intermediate molding member, said molding members having upper shaping surfaces and being movable into a spread mold position for supporting a flat glass sheet for bending and into a closed mold position to provide a substantially continuous shaping frame conforming in elevation and outline to the shape desired for the bent glass sheet, the improvement comprising cooperating cam members attached to each intermediate molding member and its adjacent end molding member, first hinge means for each intermediate molding member, second hinge means for each end molding member, connector means interconnecting said first and second hinge means and means for rotating the intermediate molding member about the first hinge means and the end molding member about the second hinge means, the first and second hinge means and the connector means being so constructed and arranged that the angular velocity of rotation of the intermediate molding members is greater than that of the end molding members.

5. The improvement according to claim 4 including an extension having a planar, elongated, upper flat glass supporting surface attached to each end molding member and extending inwardly thereof to terminate outboard of the center of the mold, said extension being so constructed to move above the intermediate molding member in the spread mold position to have its planar upper surface support a part of the undersurface of a flat glass sheet and to move below the mold shaping surface out sheet support position to nest beside its adjacent intermediate molding member when the mold assumes its closed position.

6. Apparatus for bending glass comprising a central molding member, a pair of intermediate molding members flanking the central molding member, an end molding member beyond each intermediate molding member, said molding members having upper shaping surfaces, each upper shaping surface comprising a part of a mold shaping surface, hinge means pivotally connecting each end molding member to said central molding member for movement between a spread mold position and a closed mold position, hinge means pivotally connecting each intermediate molding member to said central molding member for movement between a spread mold position and a closed mold position, and means operatively connecting each intermediate molding member and its end molding member located therebeyond and responsive to rotation of said end molding member to rotate said intermediate molding member at a greater angular velocity than that of the end molding member.

7. Apparatus as in claim 6, further including flat glass support means operatively connected to each end molding member for movement therewith and extending longitudinally inwardly thereof in close adjacency to a longitudinal margin of said shaping surface, said flat glass support means being provided with a planar, elongated, upper flat glass supporting surface movable into a position above said shaping surface when its operatively connected end molding member is rotated into the spread mold position and into a position below said shaping surface when its operatively connected end molding member is rotated into the closed mold position.

8. Apparatus as in claim 7, wherein said flat glass support means is curved in plan to conform to the curvature in plan of the intermediate molding member so that it nests beside the latter in the closed mold position.

9. Apparatus for bending glass sheets comprising a central molding member including laterally spaced, longitudinally extending shaping rails having longitudinal extremities lying in a common plane, a pair of intermediate molding members flanking the central molding member and including laterally spaced, longitudinally extending shaping rails, and an end molding member comprising a continuous shaping rail having a closed outer end beyond each intermediate molding member, each of said rails being provided with an upper shaping surface conforming to a portion of the shape desired for the bent glass sheet, hinge means pivotally connecting each end molding member to said central molding member for movement between a spread mold position and a closed position, additional hinge means pivotally connecting each intermediate molding member to said central molding member for movement between a spread mold position wherein the closed outer end of each end section shaping rail occupies a position in said common plane, and a closed mold position, and means operatively connecting each intermediate molding member and its end molding member located therebeyond and responsive to rotation of said end molding member to rotate said intermediate molding member at greater angular velocity than that of the end molding member.

10. Apparatus as in claim 9, further including flat glass support means operatively connected to each end molding member and extending longitudinally inwardly thereof in close adjacency to a longitudinally extending shaping rail along one lateral side of said apparatus, said flat glass support means being provided with a planar, elongated, upper flat glass supporting surface movable into a position in said common plane and above said shaping rail of said intermediate molding member when its operatively connected end molding member is rotated into the spread mold position and into a position below the upper shaping surface of said shaping rail of said intermediate molding member when its operatively connected end molding member is rotated into the closed mold position.

11. Apparatus for bending glass comprising a central molding member, a pair of intermediate molding members flanking the central molding member, an end molding member beyond each intermediate molding member, each said molding member having an upper shaping surface comprising part of a mold shaping surface, hinge means pivotally connecting each end molding member to said central molding member for movement between a spread mold position and a closed mold position, hinge means pivotally connecting each intermediate molding member to said central molding member for movement between a spread mold position and a closed mold position, and weight means connected to each end molding member and located inwardly of the hinge means pivotally connecting said end molding member to said central molding member to pivot said end molding member upwardly into the closed mold position, and means operatively connecting each intermediate molding member and its end molding member located therebeyond and responsive to rotation of said end molding member to rotate said intermediate molding member at a greater angular velocity than that of the end molding member.

12. Apparatus as in claim 11, further including flat glass support means operatively connected to each end molding member and extending longitudinally inwardly thereof in close adjacency to a longitudinally extending shaping rail along one lateral side of said apparatus, said flat glass support means being provided with a planar, elongated, upper flat glass supporting surface movable into a position in said common plane and above said shaping rail of said intermediate molding member when its operatively connected end molding member is rotated into the spread mold position and into a position below the upper shaping surface of said shaping rail of said intermediate molding member when its operatively connected end molding member is rotated into the closed mold position.

13. In a bending mold for bending glass sheets to non-uniform sharp curvature bends that are asymmetrical with respect to their longitudinal axis, a curved shaping surface of concave elevation into conformity with which a glass sheet is to be bent, said shaping surface including movable end molding members having upper edge surfaces defining the end portions of said shaping surface, means mounting said end molding members for movement from a spread mold position wherein their outer ends occupy a horizontal plane to a closed mold position, flat glass sheet engaging means comprising first flat glass sheet support means on said mold shaping surface intermediate said movable end molding members and located at spaced points on one side of the longitudinal center line of the mold intermediate its longitudinal extremities and engageable with one longitudinal side edge area of the flat glass sheet at spaced points along said horizontal plane, whereby the glass sheet when heated tends to sag between said spaced points, and second flat glass sheet support means located on the other side of the longitudinal center line of the mold intermediate its longitudinal extremities and engageable with the opposite longitudinal side edge area of the flat glass sheet only along a substantial portion of the length thereof along said horizontal plane, and means connecting said second flat glass sheet support means with said movable end molding members for movement threwith so that said second flat glass sheet support means support the flat glass sheet above said shaping surface when said end molding members occupy said spread mold position and as said end molding members begin their movement toward said closed mold position to locate the sharp curvature properly.

14. In a bending mold as defined in claim 13, wherein each said second flat sheet support means comprises an extension having a planar, elongated, upper flat glass supporting surface attached to each end molding member.

15. In a bending mold as defined in claim 14, wherein the extension extends inwardly of the end molding member and terminates outwardly of the center of the mold.

16. In a bending mold as defined in claim 13, including a central molding member comprising a pair of laterally spaced, longitudinally extending shaping rails, and said first flat sheet support means comprises the longitudinal extremities of one of said shaping rails.

17. Apparatus for bending glass sheets to non-uniform sharp curvature bends that are asymmetrical with respect to their longitudinal axis, said apparatus comprising a central molding member, a pair of intermediate molding members flanking the central molding member, an end molding member beyond each intermediate molding member, each said molding member having an upper shaping surface comprising part of a mold shaping surface, hinge means pivotally connecting each end molding member to said central molding member for movement between a spread mold position and a closed mold position, additional hinge means pivotally connecting each intermediate molding member to said central molding member for movement between a spread mold position and a closed mold position, and flat glass sheet engaging means comprising first flat glass sheet support means on said mold shaping surface and located at spaced points on one side of the longitudinal center line of the mold intermediate its longitudinal extremities and engageable with one longitudinal side edge area of the flat glass sheet at spaced points along said horizontal plane, whereby the glass sheet when heated tends to sag between said spaced points, and second flat glass sheet support means located on the other side of the longitudinal center line of the mold intermediate its longitudinal extremities and engageable with the opposite longitudinal side edge area of the flat glass sheet only along a substantial portion of the length thereof along said horizontal plane, and means located on the other side of the longitudinal center line of the mold intermediate its longitudinal extremities and connecting said second flat glass sheet engaging means with said movable end molding members for movement therewith so that said second flat glass sheet support means support the flat glass sheet above said shaping surface when said end molding members occupy said spread mold position and as said end molding members begin their movement toward said closed mold position to locate the sharp curvature properly.

18. In a bending mold as defined in claim 17, wherein each said second flat sheet support means comprises an extension having a planar, elongated, upper flat glass supporting surface attached to each end molding member.

19. In a bending mold as defined in claim 17, wherein the extension extends inwardly of the end molding member and terminates outwardly of the center of the mold.

20. In a bending mold as defined in claim 17, wherein the central molding member comprises a pair of laterally spaced, longitudinally extending shaping rails, and said first flat sheet support means comprises the longitudinal extremities of one of said shaping rails.

References Cited by the Examiner

UNITED STATES PATENTS

| | | | |
|---|---|---|---|
| 2,551,606 | 5/51 | Jendrisak | 65—107 |
| 2,814,164 | 11/57 | Carson et al. | 65—290 |
| 2,861,396 | 11/58 | Richardson | 65—291 |
| 2,872,756 | 2/59 | Jendrisak | 65—290 |
| 2,893,170 | 7/59 | Carson et al. | 65—107 |

FOREIGN PATENTS

| | | |
|---|---|---|
| 745,992 | 3/56 | Great Britain. |
| 1,089,973 | 10/54 | France. |
| 1,097,088 | 2/55 | France. |

DONALL H. SYLVESTER, *Primary Examiner.*

ARTHUR P. KENT, MORRIS O. WOLK, *Examiners.*